United States Patent [19]

Bergkvist et al.

[11] Patent Number: 5,617,414
[45] Date of Patent: Apr. 1, 1997

[54] POWER REDUCTION IN TIME-SPACE SWITCHES

[75] Inventors: Jan Bergkvist, Älvsjö; Peter Larsen, Rönninge, both of Sweden

[73] Assignee: Telefonaktiebolaget LM Ericsson, Stockholm, Sweden

[21] Appl. No.: 375,403

[22] Filed: Jan. 18, 1995

[30] Foreign Application Priority Data

Jan. 19, 1994 [SE] Sweden .................... 9400133

[51] Int. Cl.⁶ .................................. H04L 12/54
[52] U.S. Cl. ............................. 370/374; 379/323
[58] Field of Search ................ 370/59, 60, 60.1, 370/61, 79, 94.2; 379/322, 323, 324

[56] References Cited

U.S. PATENT DOCUMENTS

| | | | |
|---|---|---|---|
| 4,430,733 | 2/1984 | Hardy et al. | 370/110.1 |
| 4,858,227 | 8/1989 | Ratcliff | 370/59 |
| 5,280,487 | 1/1994 | Bergkvist | 371/36 |
| 5,291,479 | 3/1994 | Vaziri et al. | 370/58.2 |

FOREIGN PATENT DOCUMENTS

| | | | |
|---|---|---|---|
| 397093 | 11/1990 | European Pat. Off. | H04Q 3/52 |
| 60-201795 | 10/1985 | Japan | H04Q 3/52 |
| 61-65623 | 4/1986 | Japan | H03K 17/693 |
| 4-267698 | 9/1992 | Japan | H04Q 11/04 |
| 5-191877 | 7/1993 | Japan | H04Q 11/04 |
| 464957 | 7/1991 | Sweden | H04Q 11/04 |
| WO91/07857 | 5/1991 | WIPO | H04Q 11/04 |

*Primary Examiner*—Douglas W. Olms
*Assistant Examiner*—Russell W. Blum
*Attorney, Agent, or Firm*—Burns, Doane, Swecker & Mathis, L.L.P.

[57] ABSTRACT

In a telecommunication system, especially a telephone system having at least one electronic computer controlled telephone exchange, in its turn having time-space type switches, including a number of memory devices in the form of matrices, a method and an apparatus for transferring, via inputs and outputs of the memory devices, speech and data information in binary form between subscribers connected to the exchange. To considerably reduce the power consumption of the memory matrix as a whole, devices are provided to activate only those memories, which, for the moment, are intended to emit a corresponding output signal after that data has been written into same, and to cut off those portions of the memory matrix, which are not used for emitting output signals, in that no information is written into those, thus, not activated memories.

2 Claims, 6 Drawing Sheets

POWER REDUCTION IN TIME-SPACE SWITCHES

BACKGROUND

The invention relates to a method and an apparatus in a telecommunication system for considerably reducing the power consumption particularly in a telephone system comprising time-space type switches realized in CMOS-technique.

A known time switch is shown e.g. in U.S. Pat. No. 4,858,227. The known switch is so designed that information from any switch input can be coupled to any switch output under control by a control memory.

In today's time-space type switches the large power consumption is one of the major problems particularly when the switch matrix increases. The problem is due to the fact that the number of memory cells for storing information to be coupled through the switch, increases quadratically with the number of inputs and outputs.

A time-space switch is realized by means of memories, discrete or integrated in the form of application specific integrated circuits. This means that an input signal is copied to a number of memory cells, which is equal to the number of possible output signals from the switch. This is also the case when the input signal is to be transferred only to a single output. As mentioned above, due to this fact the power consumption increases in principle quadratically to an unacceptably high level.

As is apparent from the known apparatus a certain reduction of the power consumption is accomplished by simplifying the circuits and by reducing the number of circuits. This is also common in other known embodiments but gives just a minor reduction of the power consumption. Thus, a major part of the problem remains.

SUMMARY

The method and the apparatus according to the invention solve the problem and reduce the power consumption considerably in the time-space switch while maintaining the design and number of the circuits. This is true upon implementation by means of CMOS-memories since these memories only consume power during switching upon writing of data. At rest, they consume no or very litte power which fact is utilized upon realization of the apparatus according to the invention.

More in detail, the method and the apparatus according to the invention solve the problem by reducing the power consumption considerably in such a manner that those parts of the time-space matrix which are not utilized, are cut off, i.e. they are not activated. This is done by adding such extra information to the switch information, which prevents and enables, respectively, writing of new data into the memory cells. Neither will the contents change of those memory cells which for the moment are not used to form output signals, since the value of the data contents of the cell is not shifted. Thus, in practice, these cells will not consume any power at all.

According to the invention, in a telecommunication system, especially a telephone system comprising at least one electronic computer controlled telephone exchange, in its turn comprising time-space type switches, comprising a number of memory means in the form of matrices, the method for transferring, via inputs and outputs of said memory means, speech and data information in binary form between subscribers connected to the exchange, comprises, to considerably reduce the power consumption of the memory matrix as a whole, activating only those memories, which, for the moment, are intended to emit a corresponding output signal after that data has been written into same, and cutting off those portions of the memory matrix, which are not used for emitting output signals in that no information is written into those, thus, not activated memories.

According to the invention, in a telecommunication system, especially a telephone system comprising at least one electronic computer controlled telephone exchange, in its turn comprising time-space type switches, comprising a number of memory means in the form of matrices, the apparatus for transferring, via inputs and outputs of said memory means, speech and data information in binary form between subscribers connected to the exchange, comprises, to considerably reduce the power consumption of the memory matrix as a whole, means to activate only those memories which, for the moment, are intended to emit a corresponding output signal after that data has been written into same, and to cut off those portions of the memory matrix, which are not used for emitting output signals, in that no information is written into those, thus, not activated memories.

BRIEF DESCRIPTION OF THE DRAWING

The method and the apparatus according to the invention will be described more in detail below by means of an embodiment with reference to the appended drawing on which FIG. 1, in the form of a block diagram, shows the design of a system comprising a time-space switch, FIG. 2, in the form of a block diagram, shows the switch matrix, FIGS. 3a and b schematically show a switch matrix with the different crossing points clearly indicated.

DETAILED DESCRIPTION

Figure 1:
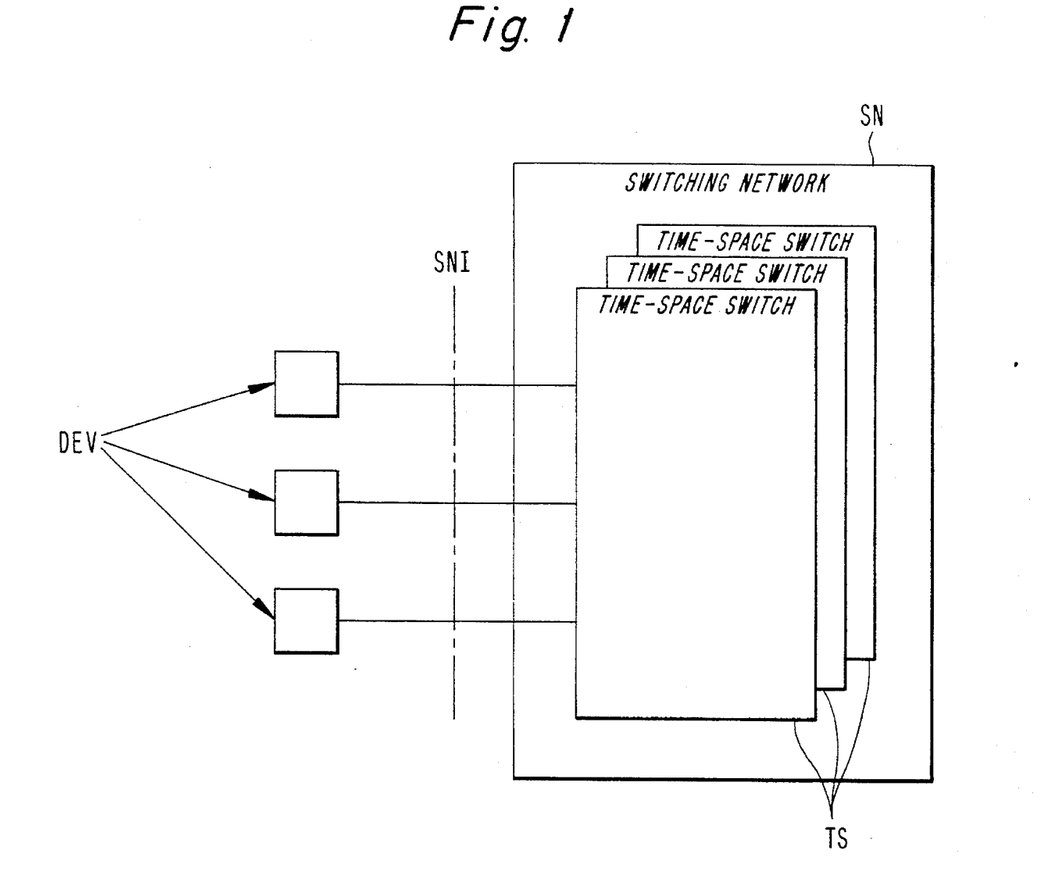

As apparent from FIG. 1, a time-space switch TS according to the invention is included in a switching network SN in a digital electronic telephone exchange. Means DEV are connected to the switch TS. Information is exchanged from and to the means DEV through the switch via an interface SNI (Switching Network Interface). The switch is mainly intended for transferring circuit-coupled information. The switch is non-blocking, i.e. the selection of inputs or outputs does not effect the switching possibilities, which means that the system can connect any incoming channel to any outgoing channel. Depending on how many subscribers there are to be served, the switch can be extended into several tiers in the exchange. In FIG. 1, an example with three switching tiers TS, is shown.

Figure 2:
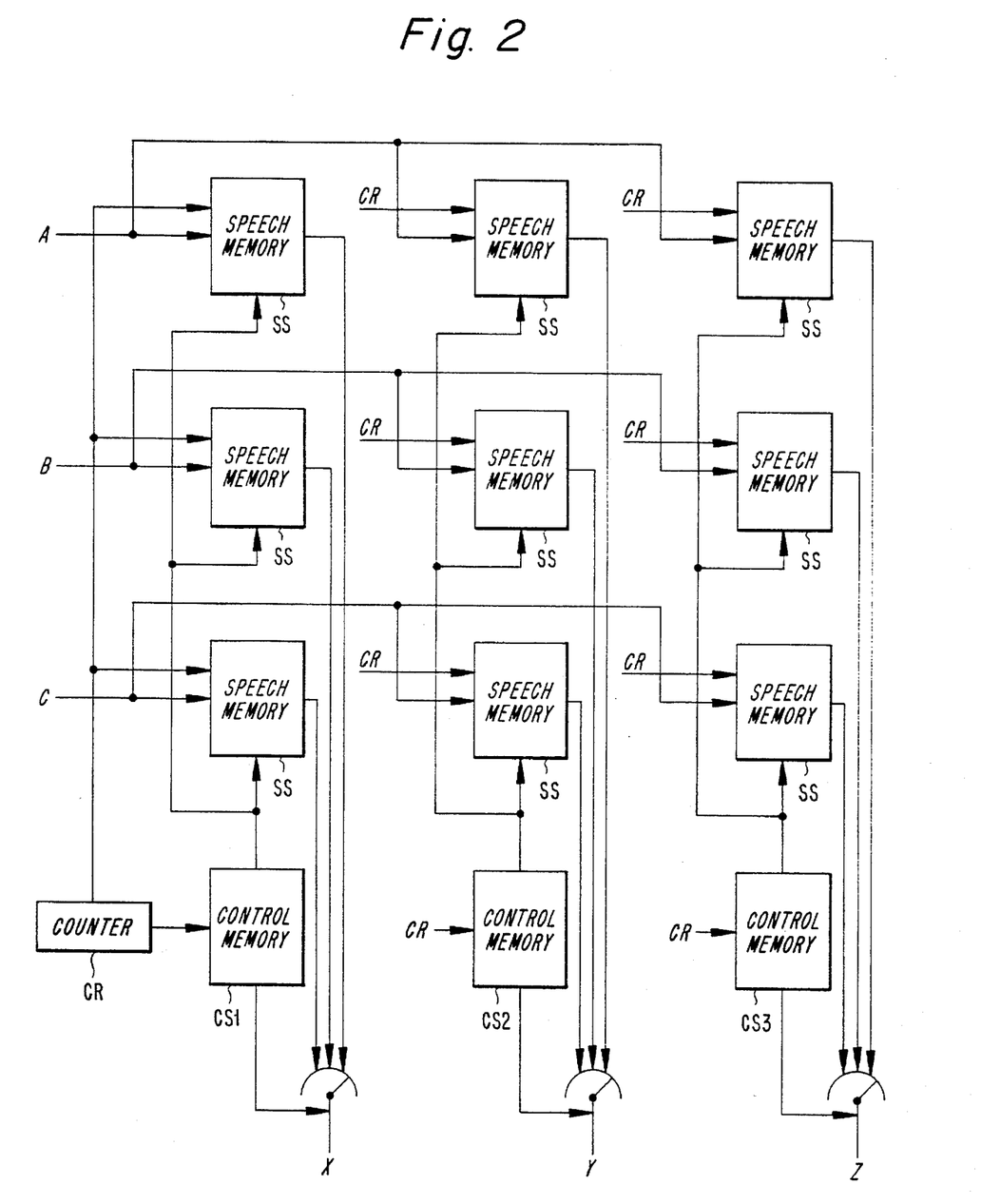

FIG. 2 shows a switch TS constructed in the form of a matrix of speech memories SS, where writing and reading take place under control of a separate control memory CS for each column of memories in the matrix.

The memory matrix is made up of a computer controlled cross-connecting unit comprising n×m connection points. The inventive idea is to reduce the number of speech memories SS into which writing is done so that data is read only into those speech memories from which data, for the moment, is read. Upon through-connection of a line, information indicating which input is to be connected to the respective output, is written into the control memories CS for the columns. The information in CS controls the reading of information into the speech memories SS so that only the memory SS concerned by the information, is activated. Thus, information as to from which speech memory or speech memories SS the output signal is to be taken, is written into the control memory CS.

Figure 3A:
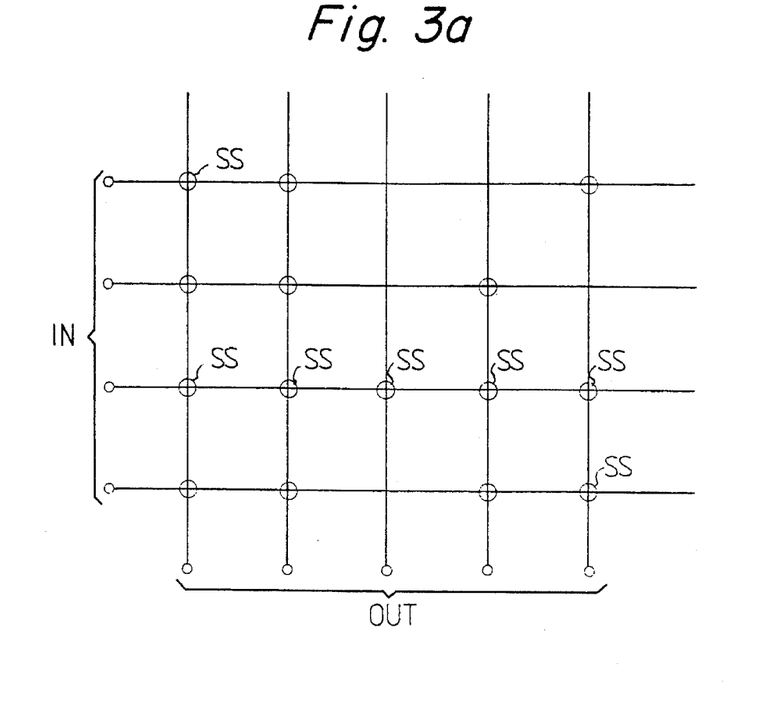
Figure 3B:
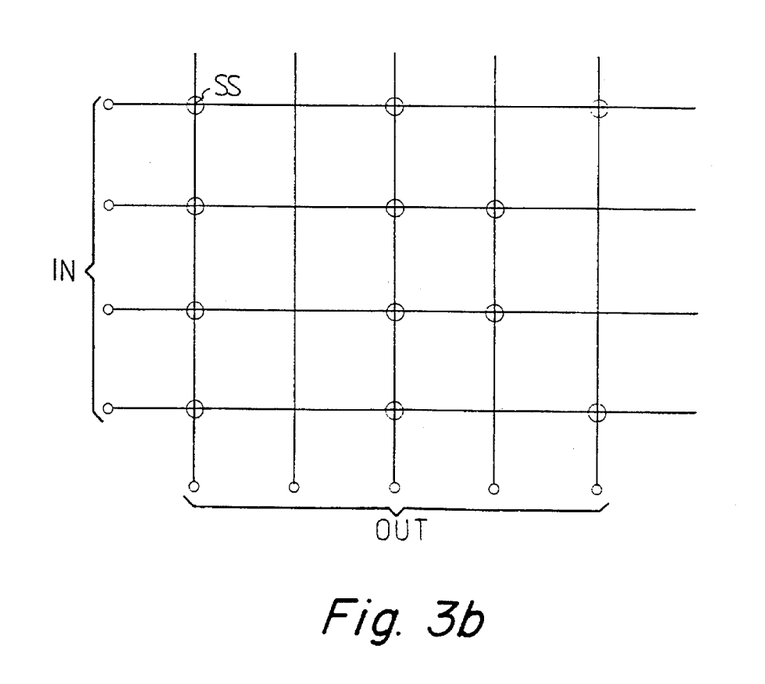

FIG. 3 shows an example of how signals from inputs IN via crossing points in a switching matrix TS, are coupled to selected outputs UT. The crossing points are realized by means of the respective speech memory SS. FIG. 3a shows for example how an input can be coupled to all outputs. FIG. 3b shows an example of how an output does not have any contact with any input. Decisive for this is the information which controls the switching from the control memory CS.

The time-space switch according to the invention is, thus, made up of a number of memories having different purposes. A speech memory SS stores the information to be coupled through the switch. A control memory CS controls the reading from one or several speech memories SS. The reading of information into a speech memory is carried out by means of a counter CR which ensures that the input data is always read-in in a certain order. The same counter is used as address pointer upon reading from the control memory CS.

The information arrives at the respective inputs of the switching matrix via the switching interface SNI in the form of binary serial data in frames, each of which comprises a number of time slots (channels), each comprising 8 bits according to the example. The contents of each time slot is stored horizontally in a row in a speech memory SS, the speech memory in this case holding 270 rows of 8 bits, in its turn corresponding to a frame.

A sample of 8 bits which is to be supplied onto a certain output can be selected at any time from any of the samples that are stored in the time stage/memory SS, which is exclusively associated with said output. The selection is done by means of a control memory CS, which is associated with the output. The delay time through the switch is very short since the samples are buffered only once between input and output. It is periodically written into the time stages (memories SS) and samples that are generated on each input, are stored m times, once for each output.

The speech memory SS is divided into a first part for writing data into the memory and a second part for reading-out data at the same time as writing takes place in said first part. Both memory parts are used alternately for writing and reading, whereby forming of queues is avoided.

The same buffering memory organization is used in the control memory CS.

Figure 4:
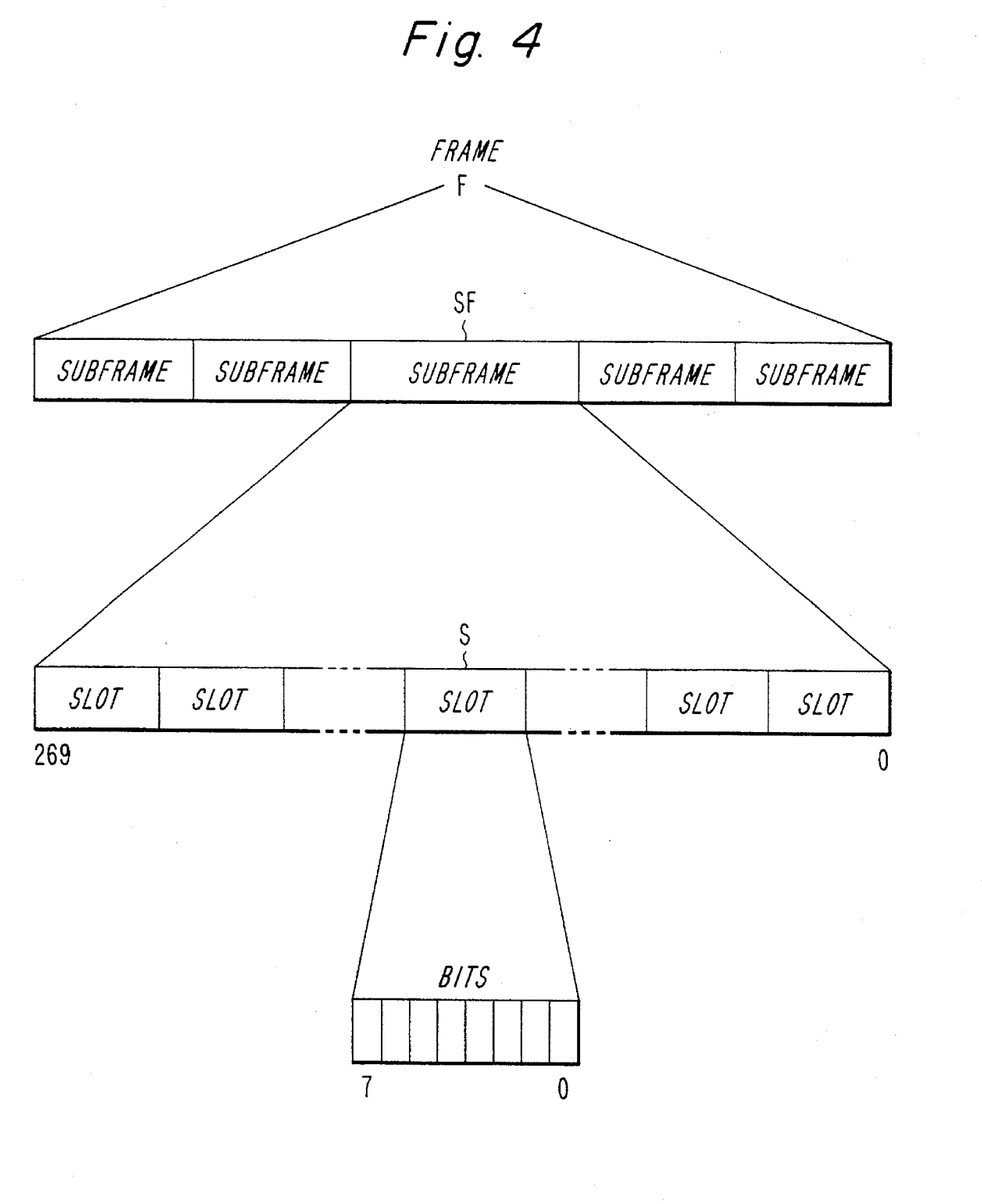
FIG. 4 shows the subdivision of the information into time slots and frames.

As apparent from FIG. 4, an incoming data flow in the form of frames F of e.g. 125 µs, comprises a number of information subframes SF, each comprising a number of time slots S (0–269), each comprising 8 bits (0–7). According to the example, each speech memory SS comprises 270 such 8-bit time slots and, thus, corresponds to a subframe SF, which also corresponds to CCITT standard SDH G707–G709. In order to, in accordance with the invention, activate or not activate the memory cells of the speech memory SS, to thereby bring about the power saving mentioned above, extra information has to be added to the normal information from the control memory CS.

Figure 5:
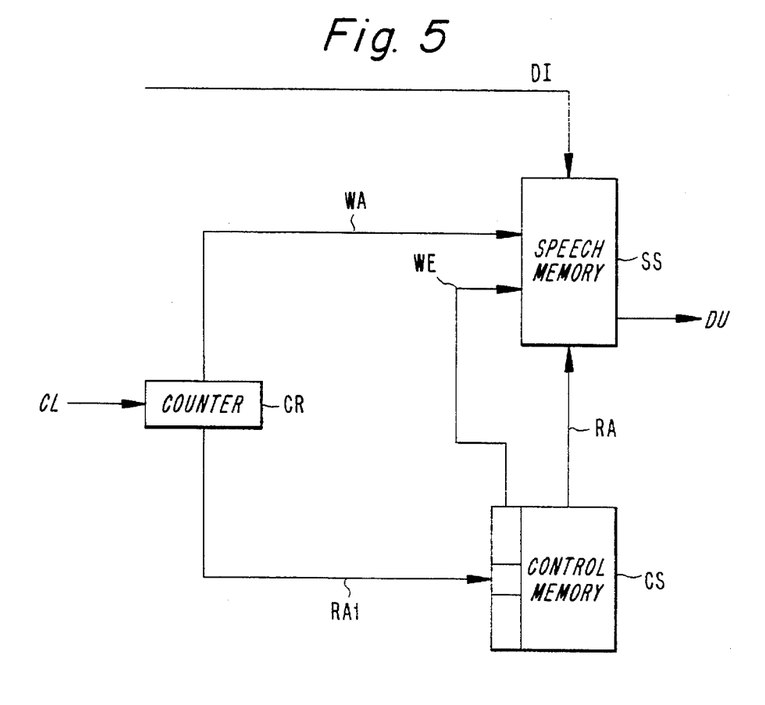
FIG. 5 illustrates how the information is written into and read out from a speech memory under control of a control memory.

FIG. 5 shows such an example. In a speech memory SS, the information is to be read into rows of memory cells (time slots). A data input DI receives the information coming into the memory. Under control of a system clock CL (not shown), a cyclically stepping counter CR supplies a writing address to the memory SS, i.e. the address tells where in the memory the incoming information is to be stored. The data information in question received on the input DI to the speech memory SS, and about to be read into a memory cell in the memory, is defined by the counter CR, the purpose of which being to control the reading of the control memory CS and the writing into the speech memory SS. By adding to the information coming in on the input DI, extra information E stored in the control memory CS, a control is obtained of whether reading into the memory cell is to take place or not and, thereby, of whether the information coming in to the input DI of the speech memory, is to be used as output signal or not. The amount of extra information E that has to be added, is dependent upon the number of speech memories SS that are controlled from one and the same control memory CS. According to the example, the extra information E can be read into an extra column in the control memory CS in the form of binary ones and zeros, a one meaning activating the speech memory SS and writing of the data signal coming in on the input DI, and a zero meaning blocking the incoming signal, i.e. no activation of the speech memory. When the counter CR by a read address RA1 points out a certain position in the control memory CS, it is noted whether the extra information E at the address pointed out, is a one or a zero. If the extra information stored at the address is a one, the control memory CS emits a write enable pulse WE to the speech memory SS, which pulse enables writing of the data information coming in to the memory SS at an address determined by a write address pulse WA from the counter CR. In the reading phase, the control memory CS supplies a read address RA2 to the speech memory SS, which read address is equal to the address where the data information coming into the memory SS, is stored, said information being read out on the output DU associated with the memory SS. If, upon pointing out the memory CS from the counter CR, the extra information which is stored at the address pointed out, is a zero, no active write enable pulse is supplied from the control memory CS to the speech memory SS, whereby the latter memory is not activated and, thus, does not consume any power since this, in the case with the CMOS circuits in question, only takes place upon switching of the memory contents. Normal bipolar memories do not have this property since they can not be cut off but are activated under all circumstances, and since they, moreover, are the dominating type of memories in most types of large exchanges, it is understood that the power saving by means of the method and the apparatus according to the invention, will be considerable.

When several speech memories SS are controlled from the same control memory CS, it is possible, instead of an extra column which when it comes to bits, is as large as the number of speech memories, to use a number of bits, which are coded according to a known coding principle. This can be done to save memory space.

Figure 6:
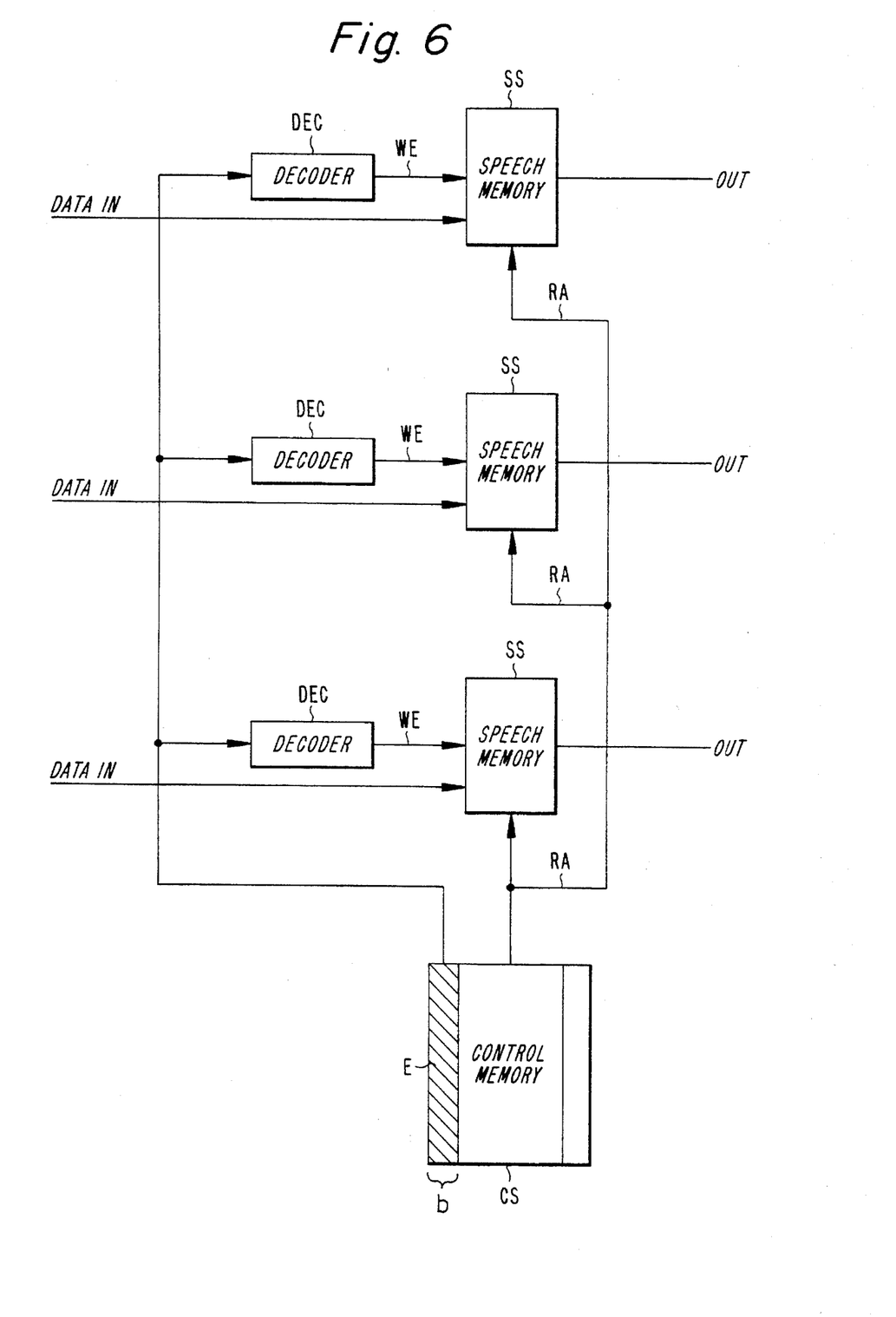
FIG. 6 illustrates how extra information according to the invention controls the writing into speech memories from a memory column in a control memory.

FIG. 6 shows an example of a column of speech memories SS which all are under control of a control memory CS common to the column. The figure shows how each speech memory SS in the column receives and decodes, by means of a standard type decoder DEC, the write enable pulse WE sent out from the memory CS and relating to said extra information E. The absence of a write enable pulse is also detected, i.e. the decoder detects whether the write enable signal is a one or a zero. The hatched field in the control memory CS in the figure, corresponds to the number of extra bits required to generate write enable pulses in relation to the number of speech memories in the column, where b stands for the number of bits adjacent to each other. The rest of the space in the memory CS, is made up of addresses for reading from the respective speech memory SS.

A process according to the invention can be described in the following manner with reference to FIG. 2.

Suppose that an input signal A is to be coupled through the switching matrix TS to an output Z. Each control memory CS1–CS3 controls the pointing out of addresses in one of the columns of the speech memories SS. The input signal A is supplied to the inputs of all speech memories SS in a first row of the matrix, the input signal B is supplied to the inputs of all speech memories in the second memory row of the matrix etc. Whether the memories are to be activated or not depends on the information supplied by the respective control memory CS. The switching takes place by means of the memory to which both the input signal A and the output signal Z are connected, which according to FIG. 2 is the uppermost memory SS in the third column of the matrix. The input signal A is to be stored in the speech memory SS in the form of a time slot at an address which is pointed out by the cyclically stepping counters CR. Under control of a read pulse from the counter CR to the control memory CS, the control memory emits, on the one hand, a write enable pulse WE to the speech memory SS, and on the other hand, a read adress to the speech memory. If the pulse WE is active, the input signal A is written into the position pointed out in the speech memory. If the pulse WE is not active, the writing is blocked and the memory is not activated. The read address from the control memory CS to the speech memory SS points out from which address in the memory, the read-out is to take place, upon activated speech memory the read-out taking place to the output Z associated with the speech memory. To practice the invention, it is necessary, as mentioned before, that an extra column of binary ones and zeros are read into the control memory CS, where the number of memory positions in the column corresponds at least to the number of memories SS in the column of the matrix TS which is controlled by said control memory CS. The writing into the control memory of said extra information as well as the rest of the control information takes place via external systems, said information being dependent on events in real time such as dialing, which thereby directly affects the information contents of the control memory CS. It should be pointed out that the information read from the speech memory SS is such information that was stored in previous time intervals and that the reading-out of the information just written in, takes place in the next time interval (cycle).

Figure 7:
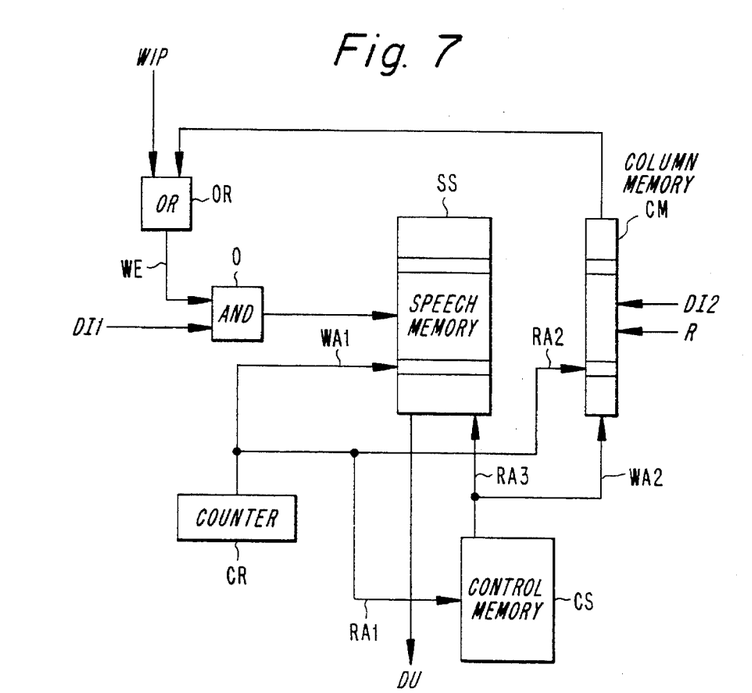
FIG. 7 illustrates how extra information according to the invention controls the writing into speech memories from a separate column in the form of a memory.

The inventive idea can also be realized in that the column for extra information in the control memory CS is provided in a separate memory CM outside the control memory. Such a solution is shown in FIG. 7. In an application where a large incoming amount of data DI1 continuously and cyclically is written into a speech memory SS but where only a portion is to be read out, it is, as shown, desirable, in an attempt to save power, to prevent the writing into the memory of such data that is not to be read out. For each memory position or group of memory positions in the speech memory SS, information is generated and stored about whether reading has taken place or not during the preceding time interval, e.g. in said separate memory CM located close to the speech memory SS. The information is then used to control the writing function to the speech memory so that writing takes place only to the memory positions that are read out. In order to, upon a change of the configuration of the switch, i.e. upon a change of the contents of the control memory CS, immediately have actual data available for reading into the speech memory SS, a "write in all positions signal" is generated, i.e. a control signal WIP which activates writing into all speech memory positions during a time interval corresponding to at least one reading cycle in the control memory CS.

An apparatus according to FIG. 7 functions so that input data DI1 is written into the positions in the speech memory SS, which are pointed out by the counter CR under control of the information from the extra column/memory CM. Each time the contents of the control memory CS is to be changed, the "write in all positions signal" WIP is activated. The memory CS is in its turn controlled by the counter CR and after a full cycle for the counter (one reading cycle for the memory CS) the contents of the memory CS is changed which immediately affects its output data. Thereafter, the memory CM is updated in that it is set to zero by a reset signal R whereupon, during the following cycle, binary ones are written-in from a data input DI2 with writing address from the memory CS, into the positions that will initiate writing into the speech memory SS. The contents in those positions of the memory CM which shall not initiate writing of data into the speech memory SS, are consequently zeros. The updating of the memory CM is then finished and the signal WIP can be cancelled. It is then supposed that binary ones in the memory CM upon reading will cause writing of the information DI1 into the speech memory SS which thereby is activated, while binary zeros in the memory CM upon reading will cause blocking of the input signal DI1 whereby the speech memory SS is not activated. In accordance with FIG. 7 and what has been described before, a cyclically stepping counter CR supplies a writing address WA1 to the speech memory SS for pointing out the address at which input data DI1 is to be written into the speech memory. The counter also emits a read address signal RA1 to the control memory CS and, moreover, a read address RA2 to the separate memory CM, which read address is the same information that constitutes write address to the speech memory SS. The read addresses RA3 to the speech memory SS from the control memory CS constitutes at the same time write addresses WA2 to said separate memory CM. Upon reading from the memory SS under control of said read signal from the control memory CS, the write signal from the memory CS to the memory CM points out the address in the latter memory at which an external signal, a binary one or zero according to the example, is to be written-in from an input DI2. When the counter CR supplies a write address pulse to the speech memory SS, the same signal is supplied as read address to the memory CM. Supposing that the counter CR points out address 7 in the speech memory, at the same address 7 in the memory CM, the information bit supplied before, is then read out. This bit is supplied to a first input of a logic circuit OR, an OR-circuit according to the example, the second input of which receiving an external control signal WIP which under at least one reading cycle in the control memory CS irrespective of the signal level on said first input, applies such a fixed signal to the logic circuit OR that a write enable signal WE supplied from the circuit after being added to the input signal DI1 in an AND-circuit O, enables writing of input data DI1 into all positions/time slots in the speech memory SS during this first cycle. This is done in order to, as mentioned before upon a change of the configuration of the switch, i.e. upon a change of data in the control memory CS, immediately have actual data available for reading in the memory SS. Reading data out from the examplified address 7 in the speech memory takes place under control of the control memory CS and the signal is supplied to an output DU. Input data DI1 is then written into the speech memory SS at the now available address 7 pointed out by the counter CR.

After this first reading cycle the signal WIP on the input of the circuit OR, is cancelled, whereupon the signal from the memory CM takes over the control of the signal WE, whereby in accordance with the information from the memory CM, only those memories .SS that for the moment are to be used for switching are given such a possibility while the other memories SS are blocked, i.e. they do not receive any active control signal WE. Also in this case it is of course true that first the information from the addresses pointed out, is read, whereupon new information is written into said addresses, which information is read out during the next time interval (cycle).

In a time-space switch there are as mentioned n×m connection points, where n corresponds to the number of inputs and m corresponds to the number of outputs of the switch. Normally, n=m, i.e. there are $n^2$ connection points. The method and the apparatus according to the invention reduce the number of "active" connection points to a number which is equal to the number of outputs of the switch. This leads to a saving which is equal to n×m−m=m(n−1). Since the power consumption in a time-space switch is directly proportional to the number of connection points it is apparent that the saving is considerable, e.g. 90% for a quadratic switch having 10 ports.

What is claimed is:

1. In a telecommunication system, especially a telephone system having at least one electronic-computer-controlled telephone exchange having time-space type switches having a plurality of speech memories connected in the form of matrices having rows and columns, wherein each column of speech memories is controlled by a respective control memory connected thereto, an apparatus for transferring, via inputs and outputs of the speech memories, speech and data information in binary form between subscribers connected to the exchange, comprising:

separate memories in the form of extra memories in the matrices, the separate memories having a plurality of memory positions having respective addresses, wherein control information signals are written into memory positions via inputs of the separate memories according to addresses from the control memories;

a counter for providing addresses;

a logic circuit for adding control information signals and speech and data information arriving at the speech memories;

wherein a control information signal, when read out from a separate memory to a speech memory according to an address from the counter and after addition in the logic circuit of information arriving at the speech memory, determines whether the information arriving at the speech memory is to be written into the speech memory at the address provided out by the counter according to a result of the addition, in which case the speech memory is activated, and whether the writing of information arriving at the speech memory is to be blocked, in which case the speech memory is not activated;

during a first read cycle after an information change in the control memory, a further control signal is applied to the logic circuit such that writing is carried out in each position in the speech memory during all of the read cycle irrespective of the control information signal, whereby after such an information change in the control memory, information is always available to be read out of the speech memory; and after such writing of information into the speech memory during all of a read cycle, the further control signal is canceled, whereupon the control information signal takes over control of writing information into the speech memory, and depending on a polarity of the control information signal, the speech memory is either activated by writing information or not activated by blocking writing information.

2. The apparatus of claim 1, wherein the logic circuit comprises an OR-circuit having a first input connected to an output of a separate memory for transferring the control information signal, a second input supplied during a first cycle after an information change in a control memory with the further control signal, and an output connected to a first input of an AND-circuit which, on a second input, receives information arriving at a time-space type switch, and an output of the AND-circuit is connected to the input of a speech memory.

* * * * *